(12) United States Patent
Otake

(10) Patent No.: US 10,384,540 B2
(45) Date of Patent: Aug. 20, 2019

(54) VEHICLE TRAVELING CONTROL APPARATUS

(71) Applicant: Toyota Jidosha Kabushiki Kaisha, Toyota-shi Aichi-ken (JP)

(72) Inventor: Hirotada Otake, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 38 days.

(21) Appl. No.: 15/670,675

(22) Filed: Aug. 7, 2017

(65) Prior Publication Data
US 2018/0037215 A1     Feb. 8, 2018

(30) Foreign Application Priority Data
Aug. 8, 2016    (JP) ................... 2016-155795

(51) Int. Cl.
| | |
|---|---|
| *B60K 28/06* | (2006.01) |
| *B60W 40/10* | (2012.01) |
| *B60W 50/00* | (2006.01) |
| *B60W 50/10* | (2012.01) |
| *B60W 30/18* | (2012.01) |
| *B60W 10/18* | (2012.01) |
| *B60W 40/08* | (2012.01) |

(52) U.S. Cl.
CPC ....... *B60K 28/06* (2013.01); *B60W 30/18054* (2013.01); *B60W 40/10* (2013.01); *B60W 50/0098* (2013.01); *B60W 50/10* (2013.01); *B60W 10/18* (2013.01); *B60W 2040/0818* (2013.01); *B60W 2540/10* (2013.01); *B60W 2540/103* (2013.01); *B60W 2540/12* (2013.01); *B60W 2540/26* (2013.01)

(58) Field of Classification Search
CPC . B60K 28/06; B60W 30/18054; B60W 50/10; B60W 50/0098; B60W 40/10; B60W 2540/103; B60W 2540/12; B60W 2540/26; B60W 2540/10; B60W 2040/0818; B60W 10/18
See application file for complete search history.

(56) References Cited

U.S. PATENT DOCUMENTS

2005/0270145 A1    12/2005   Kataoka et al.
2006/0025918 A1    2/2006   Saeki
(Continued)

FOREIGN PATENT DOCUMENTS

| JP | 2006-315491 A | 11/2006 |
|---|---|---|
| JP | 2008-195402 A | 8/2008 |

(Continued)

OTHER PUBLICATIONS

U.S. Appl. No. 15/432,497 Inventor: Hirotada Otake.

*Primary Examiner* — Dale W Hilgendorf
(74) *Attorney, Agent, or Firm* — Dinsmore & Shohl LLP

(57) ABSTRACT

A vehicle traveling control apparatus stops a vehicle when the driver is under the abnormal state that the driver loses an ability of driving the vehicle, and then performs a stopped state maintaining control to maintain the vehicle at the stopped state. The control apparatus forbids a termination of the stopped state maintaining control if the acceleration pedal operation amount is equal to or greater than a threshold value greater than zero when the termination of the stopped state maintaining control is requested.

6 Claims, 8 Drawing Sheets

(56) References Cited

U.S. PATENT DOCUMENTS

| | | | | |
|---|---|---|---|---|
| 2013/0009761 A1* | 1/2013 | Horseman | B60K 28/06 |
| | | | 340/425.5 |
| 2013/0018549 A1* | 1/2013 | Kobana et al. | B60K 28/06 |
| | | | 701/41 |
| 2013/0311043 A1* | 11/2013 | Kobana et al. | B60K 28/06 |
| | | | 701/41 |
| 2017/0158054 A1* | 6/2017 | Munaoka et al. | |
| | | | B60W 2040/081 |
| 2017/0322558 A1* | 11/2017 | Teshima et al. | B60K 28/06 |
| 2018/0111628 A1* | 4/2018 | Tamagaki et al. | B60K 28/06 |

FOREIGN PATENT DOCUMENTS

| | | |
|---|---|---|
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2012111263 A | 6/2012 |
| JP | 2014-148293 A | 8/2014 |
| JP | 2015089725 A | 5/2015 |
| WO | 2012105030 A1 | 8/2012 |

\* cited by examiner

VEHICLE TRAVELING CONTROL APPARATUS

CROSS-REFERENCE TO RELATED APPLICATIONS

This application claims priority to Japanese Patent Application No. 2016-155795 filed on Aug. 8, 2016, which is incorporated herein by reference in its entirety including the specification, drawings, and abstract.

BACKGROUND

1. Technical Field

The present disclosure relates to a vehicle traveling control apparatus for decreasing a vehicle speed of a vehicle to stop the vehicle when a driver of the vehicle is under an abnormal state that the driver loses an ability of driving the vehicle.

2. Description of the Related Art

There is proposed an apparatus which determines whether or not a driver of a vehicle is under an abnormal state that the driver loses an ability of driving the vehicle (for example, a state that the driver drives the vehicle while sleeping, a state that a mind and body function of the driver stops, or the like), and which decelerates the vehicle to stop the vehicle when it is determined that the driver is under the abnormal state (refer to WO 2012/105030). Hereinafter, this apparatus will be referred to as a "conventional apparatus".

The conventional apparatus executes a stopped state maintaining control for maintaining the vehicle at a stopped state by forbidding an "acceleration of the vehicle on the basis of a change in an operation amount of an acceleration pedal of the vehicle", after the vehicle is stopped. Hereinafter, the acceleration of the vehicle on the basis of the change in the operation amount of the acceleration pedal will be referred to as an "acceleration pedal operation override".

SUMMARY

Such an apparatus may include a stop request button which is operated for requesting for stopping/terminating the stopped state maintaining control by the driver or a rescuer. When the stop request button is operated, the apparatus may stop the stopped state maintaining control.

After the vehicle is stopped owing to the determination that the driver is under the abnormal state that the driver loses the ability of driving the vehicle (hereinafter, simply referred to as the "abnormal state"), the rescuer and the like for rescuing the driver may mistakenly operate the stop request button. In this case, the stopped state maintaining control is terminated/stopped. As a result, since the forbidding of the acceleration pedal operation override is cancelled, the vehicle may be suddenly accelerated while rescuing the driver, if the acceleration pedal is in an operated state due to the posture of the driver under the abnormal state.

The present disclosure has been made for solving the aforementioned problem. One of objects of the present disclosure is to provide a vehicle traveling control apparatus (hereinafter, referred to as a "present apparatus") which can prevent the vehicle from being suddenly accelerated when the stop/termination of the stopped state maintaining control is mistakenly requested in a period in which the vehicle is maintained at the stopped state by the stopped state maintaining control.

The present apparatus is applied to a vehicle comprising:
a driving force supplying device (internal combustion engine 32) for supplying a driving force for traveling the vehicle to drive wheels of the vehicle;
a braking force applying device (41, 42, 51) for applying a braking force to the vehicle; and
an acceleration pedal operation amount detecting sensor (11) for detecting an acceleration pedal operation amount of the vehicle.

The present apparatus comprises an electric control unit (10, 30, 40, 50). The electric control unit is configured to continuously determine whether or not a driver of the vehicle is under an abnormal state that the driver loses an ability of driving the vehicle (refer to steps 315 to 325 in FIG. 3, steps 410, 412 and 417 in FIG. 4). The electric control unit (10, 30, 40, 50) is configured to execute a vehicle stop control for having the braking force applying device (41, 42, 51) device apply the braking force to the vehicle to stop the vehicle (refer to step 525 in FIG. 5) after the electric control unit determines that the driver is under the abnormal state (refer to a "Yes" determinations at step 505 in FIG. 5).

The electric control unit is configured to acquire a driver requiring driving force (TQd) which is a driving force required by the driver and is decided on the basis of the acceleration pedal operation amount (AP), and to execute a stopped state maintaining control for maintaining the vehicle at a stopped state by performing a driving force limiting control for limiting a supply requiring driving force (TQdreq) which the driving force supplying device (engine 32) is requested to supply to the drive wheels on the basis of the driver requiring driving force (TQd) to a value equal to or smaller than a driving force which is smaller than the driver requiring driving force, and by performing a continuous braking to continuously apply the braking force to the vehicle from the braking force applying device(41, 42, 51) (refer to step 540), while the vehicle is stopped through the vehicle stop control (refer to steps 510 and 525 in FIG. 5).

The electric control unit (10, 30, 40, 50) is configured to forbid a termination/stop of the stopped state maintaining control (refer to step 632) if the acceleration pedal operation amount is equal to or greater than a threshold value larger than zero (refer to a "No" determination at step 615), when the termination of the stopped state maintaining control is requested (refer to a "Yes" determination at step 610) during executing the stopped state maintaining control.

According to the present apparatus, the termination/stop of the stopped state maintaining control is forbidden when the termination/stop of the stopped state maintaining control is requested while the acceleration pedal operation amount is equal to or greater than the threshold value greater than zero. Therefore, the termination/stop of the stopped state maintaining control is forbidden in a state where the acceleration pedal is operated relatively greatly (for example, a state in which the acceleration pedal is depressed or the like) even when the termination/stop of the stopped state maintaining control is requested. As a result, it is possible to prevent the vehicle from being suddenly accelerated when the termination/stop of the stopped state maintaining control is mistakenly requested.

In one of aspects of the present apparatus, the electric control unit (10, 30, 40, 50) is configured to permit the termination of the stopped state maintaining control if the acceleration pedal operation amount is smaller than the threshold value, when the termination of the stopped state maintaining control is requested during executing the stopped state maintaining control (refer to step 615, and step 620).

According to this aspect, the termination/stop of the stopped state maintaining control is permitted when the termination/stop of the stopped state maintaining control is requested while the acceleration pedal operation amount is smaller than the threshold value greater than zero. Therefore, the termination/stop of the stopped state maintaining control is permitted at the time point at which the termination/stop of the stopped state maintaining control is requested, under a situation/condition where the own vehicle is unlikely to be suddenly accelerated since the acceleration pedal is not greatly operated.

In one of aspects of the present apparatus, the electric control unit (10, 30, 40, 50) is configured in such a manner that the termination of the stopped state maintaining control is requested when a specific operation of the acceleration pedal is conducted/detected.

According to this aspect, the termination/stop of the stopped state maintaining control is forbidden in a state where the acceleration pedal is greatly operated, when the termination/stop of the stopped state maintaining control is requested through the specific operation of the acceleration pedal. As a result, it is possible to prevent the vehicle from being suddenly accelerated when the termination/stop of the stopped state maintaining control is mistakenly requested through the specific operation of the acceleration pedal.

In the above description, references used in the following descriptions regarding embodiments are added with parentheses to the elements of the present disclosure, in order to assist in understanding the present disclosure. However, those references should not be used to limit the scope of the present disclosure. Other objects, other features, and accompanying advantages of the present disclosure will be readily understood from the description of embodiments of the present disclosure to be given referring to the following drawings.

DETAILED DESCRIPTION OF EMBODIMENTS

Hereinafter, with reference to the drawings, a vehicle traveling control apparatus (or a vehicle driving assist apparatus) according to an embodiment of the present disclosure will be described.

The vehicle traveling control apparatus according to the embodiment of the present disclosure (hereinafter, referred to as the "embodiment apparatus") is applied to a vehicle. The vehicle will be referred to as the "own vehicle" in order to distinguish the vehicle, to which the embodiment apparatus is applied, from the other vehicles.

Figure 1:
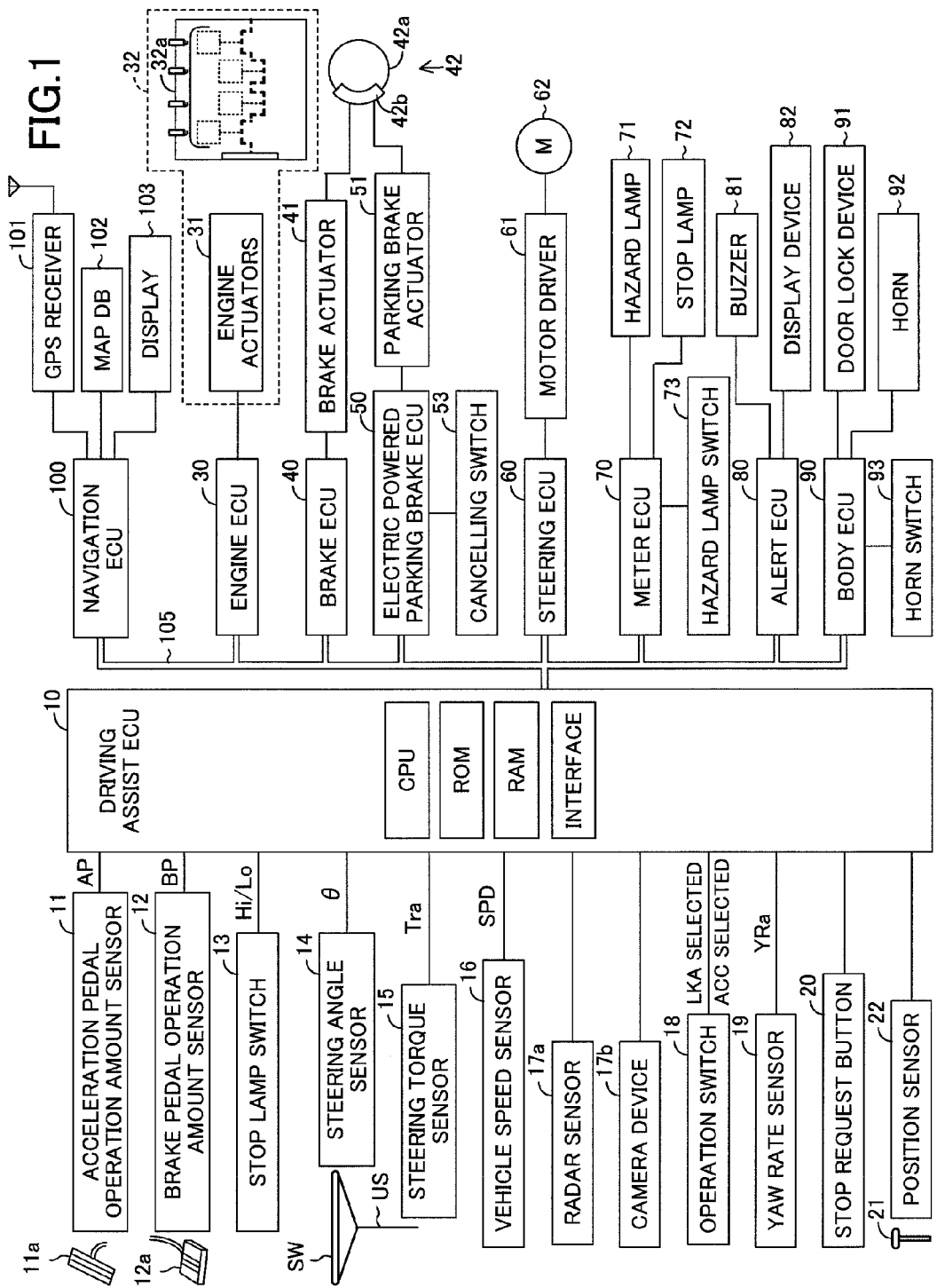
FIG. 1 is a view for showing a general configuration of a vehicle traveling control apparatus according to an embodiment of the present disclosure.

As shown in FIG. 1, the embodiment apparatus includes a driving support (driving assist) ECU 10, an engine ECU 30, a brake ECU 40, an electric powered parking brake ECU 50, a steering ECU 60, a meter ECU 70, an alert ECU 80, a body ECU 90, and a navigation ECU 100.

Each of the ECUs is an electric control unit including a microcomputer as a main part. The ECUs are connected to each other via a CAN (Controller Area Network) 105 such that the ECUs send and receive data to and from each other. In this description, the microcomputer includes a CPU, a ROM (a non-volatile memory), a RAM, an interface, and the like. The CPU realizes various functions by executing instructions or programs or routines stored in the ROM. Some of the ECUs or all of the ECUs may be integrated to a single ECU.

The driving support ECU 10 is electrically connected to sensors including switches described later and receives detection signals or output signals of the sensors, respectively. The sensors may be electrically connected to any of the ECUs other than the driving support ECU 10. In this case, the driving support ECU 10 receives the detection signals or the output signals of the sensors from the ECUs to which the sensors are electrically connected via the CAN 105.

An acceleration pedal operation amount sensor 11 detects an operation amount AP of an acceleration pedal 11a of the own vehicle and outputs a detection signal or an output signal representing the operation amount AP to the driving support ECU 10. Hereinafter, the operation amount AP will be referred to as the "acceleration pedal operation amount AP". A brake pedal operation amount sensor 12 detects an operation amount BP of a brake pedal 12a of the own vehicle and outputs a detection signal or an output signal representing the operation amount BP to the driving support ECU 10. Hereinafter, the operation amount BP will be referred to as the "brake pedal operation amount BP".

A stop lamp switch 13 outputs a low-level output signal to the driving support ECU 10 when the brake pedal 12a is not depressed, that is, when the brake pedal 12a is not operated. On the other hand, the stop lamp switch 13 outputs a high-level output signal to the driving support ECU 10 when the brake pedal 12a is depressed, that is, when the brake pedal 12a is operated.

A steering angle sensor 14 detects a steering angle θ of the own vehicle and outputs a detection signal or an output signal representing the steering angle is θ to the driving support ECU 10. A steering torque sensor 15 detects a steering torque Tra applied to a steering shaft US of the own vehicle by an operation of a steering wheel SW and outputs a detection signal or an output signal representing the steering torque Tra to the driving support ECU 10. A vehicle speed sensor 16 detects a traveling speed SPD of the own vehicle and outputs a detection signal or an output signal representing the traveling speed SPD to the driving support ECU 10. Hereinafter, the traveling speed SPD will be referred to as the "vehicle speed SPD".

A radar sensor 17a acquires information on a road in front of the own vehicle and three dimensional objects on the road. The three-dimensional objects include, for example, moving objects such as pedestrians, bicycles, vehicles and the like and motionless objects such as power poles, trees, guardrails and the like. Hereinafter, these three-dimensional objects will be referred to as "the target object".

The radar sensor 17a includes a radar transmitting/receiving part (not shown) and a signal processing part (not shown). The radar transmitting/receiving part transmits radio waves each having a millimeter wave band to an area surrounding the own vehicle including an area in front of the own vehicle and receives the radio waves reflected by the target objects existing within a radiation range. Hereinafter, the radio wave having the millimeter wave band will be referred to as "the millimeter wave" and the radio wave reflected by the target object will be referred to as "the reflected wave". The signal processing part acquires an inter-vehicle distance (i.e. a longitudinal distance), a relative vehicle speed, a lateral distance, a relative lateral vehicle speed and the like each time a predetermined time elapses on the basis of a phase difference between the transmitted millimeter wave and the received reflected wave, a damping level of the received reflected wave with respect to the transmitted millimeter wave, a time from a transmission of the millimeter wave to a reception of the reflected wave and the like.

A camera device 17b includes a stereo camera (now shown) and an image processing part (not shown). The stereo camera takes a pair of right and left images of landscapes at a right side of the own vehicle in front of the own vehicle and at a left side of the own vehicle in front of the own vehicle. The stereo camera acquires image data from the images of the landscapes at the right and left sides of the own vehicle. The image processing part determines whether or not the target object exists and calculates a relationship between the target object and the own vehicle and the like to output them on the basis of the image data of the images of the landscapes at the right and left sides of the own vehicle taken by the stereo camera.

The driving support ECU 10 determines the relationship between the own vehicle and the target object, that is, determines target object information on the target object by combining the relationship between the own vehicle and the target object acquired by the radar sensor 17a and the relationship between the own vehicle and the target object acquired by the camera device 17b. Further, the driving support ECU 10 realizes lane markers such as right and left lane lines provided on the road on the basis of the image data of the images of the landscapes at the right and left sides of the own vehicle taken by the camera device 17b and acquires a shape of the road such as a curvature radius of the road representing a degree of a curvature of the road, a positional relationship between the road and the own vehicle and the like. In addition, the driving support ECU 10 acquires information on whether or not a road side wall exists on the basis of the image data acquired by the camera device 17b.

An operation switch 18 is operated by a driver of the own vehicle. The driver can control an execution of a lane keeping assist control (LKA) described later by operating the operation switch 18. Further, the driver can control an execution of a following-travel inter-vehicle-distance control such as an adaptive cruise control (ACC) described later by operating the operation switch 18.

A yaw rate sensor 19 detects a yaw rate YRa of the own vehicle and outputs a detection signal or an output signal representing the yaw rate YRa to the driving support ECU 10.

A stop request button 20 is provided at a position which the driver can operates. When the stop request button 20 is not operated, the stop request button 20 outputs a low-level output signal to the driving support ECU 10. On the other hand, when the stop request button 20 is operated, the stop request button 20 outputs a high-level output signal to the driving support ECU 10.

A shift lever 21 can be set at any of a forward traveling range, a rearward traveling range, a neutral range and a parking range. Hereinafter, the forward traveling range will be referred to as "the D range", the rearward traveling range will be referred to as "the R range", the neutral range will be referred to as "the N range" and the parking range will be referred to as "the P range".

A position sensor 22 is electrically connected to the shift lever 21. The position sensor 22 detects a range, at which the shift lever 21 is set, i.e., a set position of the shift lever 21 and outputs a detection signal or an output signal representing the set position of the shift lever 21 to the driving support ECU 10. The driving support ECU 10 acquires the set position of the shift lever 21 on the basis of the detection signal output from the position sensor 22.

When the shift lever 21 is set at the D range, the driving support ECU 10 controls a transmission (not shown) of the own vehicle such that a torque output from an internal combustion engine 32 is supplied to drive wheels (not shown) of the own vehicle as a driving force for traveling the own vehicle forward. In this case, when the acceleration pedal 11a is operated, the torque is supplied from the engine 32 to the drive wheels and as a result, the own vehicle travels forward. Hereinafter, the torque output from the engine 32 will be referred to as "the engine torque".

When the shift lever 21 is set at the R range, the driving support ECU 10 controls the transmission such that the engine torque is supplied to the drive wheels as the driving force for traveling the own vehicle rearward. In this case, when the acceleration pedal 11a is operated, the engine torque is supplied to the drive wheel and as a result, the vehicle travels rearward.

When the shift lever 21 is set at the N range, the driving support ECU 10 controls the transmission such that the engine torque is not supplied to the drive wheels. In this case, even when the acceleration pedal 11a is operated, the engine torque is not supplied to the drive wheels and as a result, the own vehicle does not travel.

When the shift lever 21 is set at the P range, the driving support ECU 10 controls the transmission such that the engine torque is not supplied to the drive wheels and activates a parking lock mechanism (not shown) provided in a transaxle (not shown) to brake the drive wheels. In this case, even when the acceleration pedal 11a is operated, the engine torque is not supplied to the drive wheels and the drive wheels are braked by the parking lock mechanism such that the drive wheels does not rotate. Thereby, the own vehicle is maintained at a stopped state.

The engine ECU 30 is electrically connected to engine actuators 31 of the engine 32. The engine actuators 31 change operation states of a body 32a of the engine 32, respectively. In this embodiment, the engine 32 is a gasoline-fuel-injection spark-ignition type multi-cylinder internal combustion engine and includes a throttle valve (not shown) for adjusting an amount of air flowing into combustion chambers (not shown) of the engine 32. The engine actuators 31 include at least a throttle valve actuator (not shown) for changing an opening degree of the throttle valve.

The engine ECU 30 can change the engine torque generated by the engine 32 by controlling activations of the engine actuators 31. The engine torque generated by the engine 32 is transmitted to the drive wheels through the transmission. Therefore, the engine ECU 30 can change an acceleration or an acceleration state by controlling the driving force supplied to the own vehicle, in particular, to the drive wheels by controlling the activations of the engine actuators 31.

The brake ECU 40 is electrically connected to a brake actuator 41. The brake actuator 41 is provided in a hydraulic circuit provided between a master cylinder (not shown) for pressurizing hydraulic oil by a depression force of the brake pedal 12a and a friction brake mechanism provided in right and left front and rear wheels of the own vehicle. The friction brake mechanism 42 includes brake discs 42a each secured to the corresponding wheel of the own vehicle and brake calipers 42b secured to the body of the own vehicle at the corresponding wheel.

The brake actuator 41 adjusts a hydraulic pressure supplied to a wheel cylinder (not shown) in each of the brake caliper 42b, depending on a command sent from the brake ECU 40 to activate the wheel cylinder by the hydraulic pressure to press a brake pad (not shown) on the brake disc 42a, thereby to generate a friction braking force on the brake disc 42a. Therefore, the brake ECU 40 can control an activation of the brake actuator 41 to control a braking force applied to the own vehicle, in particular, to the wheels. Hereinafter, a braking of the own vehicle by controlling the activation of the brake actuator 41 will be referred to as "the hydraulic braking performed by the friction brake mechanism 42" or simply as "the hydraulic braking".

The electric powered parking brake ECU 50 is electrically connected to a parking brake actuator 51. The parking brake actuator 51 generates the friction braking force by pressing the brake pad on the brake disc 42a. Alternatively, when the own vehicle includes drum brakes in the wheels of the own vehicle, respectively, the parking brake actuator 51 generates the friction braking force by pressing a shoe on a drum which rotates together with the corresponding wheel. Therefore, the electric powered parking brake ECU 50 can apply the friction braking force to the wheels by activating the parking brake actuator 51. Hereinafter, the braking of the own vehicle by activating the parking brake actuator 51 will be referred to as "the electric powered parking brake (EPB) braking".

A canceling switch 53 is electrically connected to the electric powered parking brake ECU 50. When the cancelling switch 53 is operated, a stop of the EPB braking is requested to the electric powered parking brake ECU 50.

The steering ECU 60 is a control device of a known electric powered steering system and is electrically connected to a motor driver 61. The motor driver 61 is electrically connected to a steering motor 62. The steering motor 62 is assembled in a steering mechanism (not shown) of the own vehicle including the steering wheel SW, the steering shaft US connected to the steering wheel SW, a steering gear mechanism (not shown) and the like. The steering motor 62 generates a torque by an electric power supplied from the motor driver 61 and uses the torque to apply a steering assist torque to the steering shaft US to steer the right and left steered wheels.

The meter ECU 70 is electrically connected to a digital display meter (not shown), a hazard lamp 71 and a stop lamp 72. The meter ECU 70 blinks the hazard lamp 71 and lights the stop lamp 72, depending on a command sent from the driving support ECU 10.

The meter ECU 70 is electrically connected to a hazard lamp switch 73. When the hazard lamp switch 73 is operated while the hazard lamp 71 does not blink, the driving support ECU 10 requests the meter ECU 70 to blink the hazard lamp 71. On the other hand, when the hazard lamp switch 73 is operated vehicle the hazard lamp 71 blinks, the driving support ECU 10 requests the meter ECU 70 to stop a blinking of the hazard lamp 71.

The alert ECU 80 is electrically connected to a buzzer 81 and a display device 82. The alert ECU 80 can perform an attention to the driver by causing the buzzer 81 to generate sounds, depending on a command sent from the driving support ECU 10. In addition, the alert ECU 80 can cause the display device 82 to light an attention mark such as a warning lamp and/or display an attention message and an operation state of a driving assist control. Hereinafter, a generation of the sounds performed by the buzzer 81, a fighting of the attention mark performed by the display device 82 and the like will be referred to as "the non-driving-operation alert".

The body ECU 90 is electrically connected to a door lock device 91 and a horn 92. The body ECU 90 causes the door lock device 91 to release a lock of doors (not shown) of the own vehicle, depending on a command sent from the driving support ECU 10. Further, the body ECU 90 causes the horn 92 to generate sounds, depending on a command sent from the driving support ECU 10.

The body ECU 90 is electrically connected to a horn switch 93. When the horn switch 93 is operated while the horn 92 generates the sounds, the body ECU 90 is requested to terminate/stop performing a sound generation from the horn 92.

The navigation ECU 100 is electrically connected to a GPS receiver 101 which receives a GPS detection signal for detecting a present position of the own vehicle, a map database 102 which stores a map information and the like, a touch-screen type display 103 which is a human-machine interface and the like. The navigation ECU 100 identifies the present position of the own vehicle on the basis of the GPS detection signal, performs various calculations on the basis of the present position of the own vehicle and the map information and the like stored in the map database 102 and performs a route guidance using the display 103.

The map information stored in the map database 102 includes road information. The road information includes parameters which show a road shape of each of segments of the road such as a road curvature radius or a road curvature which shows a degree of a curve of the road. The curvature corresponds to an inverse number of the curvature radius.

<Outline of Operation of Embodiment Apparatus>

Next, an outline of an operation of the embodiment apparatus will be described. The driving support ECU 10 of the embodiment apparatus is configured or programmed to execute the lane keeping control (LKA) and the following/trailing-travel inter-vehicle-distance control (ACC). Further, the driving support ECU 10 determines whether or not the driver is under an abnormal state in which the driver loses his/her ability of driving the own vehicle repeatedly when the lane keeping control and the following-travel inter-vehicle-distance control are being executed. The abnormal state in which the driver loses his/her ability of driving the own vehicle is simply referred to as the "abnormal state". When the driver continues to be under the abnormal state in a period until a predetermined time elapses from a time point at which the driving support ECU 10 has determined that the driver has been under the abnormal state, the driving support ECU 10 decelerates the own vehicle to stop the own vehicle.

An outline of processes for stopping the own vehicle when the driver continues to be under the abnormal state will next be described, however, the lane keeping control and the following-travel inter-vehicle-distance control will be described first, since a determination of whether or not the driver is under the abnormal state is performed only when both the lane keeping control and the following-travel inter-vehicle-distance control are being executed. In other words, a condition that the lane keeping control and the following-travel inter-vehicle-distance control are being executed must be satisfied to perform the determination as to whether or not the driver is under the abnormal state.

<Lane Keeping Assist Control (LKA)>

The lane keeping control is a control for assisting a steering operation of the driver by applying the steering torque to the steering mechanism to keep the position of the own vehicle along a target traveling line within a lane, in which the own vehicle travels. Hereinafter, the lane, in which the own vehicle travels, will be referred to as the "traveling lane". The lane keeping control is known (for example, refer to JP 2008-195402 A, JP 2009-190464 A, JP 2010-6279 A and JP 4349210 B). Therefore, below, the lane keeping control will be briefly described.

The driving support ECU 10 identifies (recognizes) the right and left lane lines of the traveling lane on the basis of the image data sent from the camera device 17b to determine a center position between the right and left lane lines as a target traveling line. Further, the driving support ECU 10 calculates a curve radius, i.e., a curvature radius R of the target traveling line. The driving support ECU 10 calculates a position and a direction of the own vehicle in the traveling lane which is defined by the right and left lane lines.

Then, the driving support ECU 10 calculates a distance Dc between a front center position of the own vehicle and the target traveling line in a lateral direction or width direction of the road and a difference angle $\theta y$ between the target traveling line and a traveling direction of the own vehicle. Hereinafter, the distance Dc will be referred to as the "center distance Dc", and the difference angle $\theta y$ will be referred to as the "yaw angle $\theta y$".

Further, the driving support ECU 10 calculates a target yaw rate YRctgt every time a predetermined calculation cycle elapses on the basis of the center distance Dc, the yaw angle $\theta y$, and the road curvature $v$ (=1/R) in accordance with a following expression (1). In the expression (1), K1, K2 and K3 are control gains. The target yaw rate YRctgt is a yaw rate which is set to cause the own vehicle to travel along the target traveling line.

$$YRctgt = K1 \times Dc + K2 \times \theta y + K3 \times v \quad (1)$$

The driving support ECU 10 calculates a target steering torque Trtgt for accomplishing the target yaw rate YRctgt every time the predetermined calculation cycle elapses on the basis of the target yaw rate YRctgt and the actual yaw rate YRa.

More specifically, the driving support ECU 10 previously stores a look-up table which defines a relationship between the target steering torque Trtgt and a difference between the target yaw rate YRctgt and the actual yaw rate YRa. The driving support ECU 10 calculates the target steering torque Trtgt by applying the difference between the target yaw rate YRctgt and the yaw rate YRa to the look-up table. Then, the driving support ECU 10 controls the steering motor 62 through the steering ECU 60 such that the actual steering torque Tra becomes equal to the target steering torque Trtgt. In this manner, the lane keeping control is executed.

<Following-Travel Inter-Vehicle-Distance Control (ACC)>

The following-travel inter-vehicle-distance control is a control for having the own vehicle follow/trail a preceding vehicle which travels right ahead of the own vehicle while maintaining an inter-vehicle distance between the preceding vehicle and the own vehicle at a predetermined distance. The following-travel inter-vehicle-distance control is known (for example, JP 2014-148293 A, JP 2006-315491 A, JP 4172434 B and JP 4929777 B). Therefore, below, the following-travel inter-vehicle-distance control will be briefly described.

The driving support ECU 10 executes the following-travel inter-vehicle-distance control when an execution of the following-travel inter-vehicle-distance control is requested by an operation of the operation switch 18.

More specifically, the driving support ECU 10 selects a vehicle which the own vehicle should follow/trail on the basis of the target object information acquired by a surrounding sensor 17 including the radar sensor 17a and the camera device 17b when the execution of the following-travel inter-vehicle-distance control is requested. The vehicle which the own vehicle should follow will be referred to as the "target vehicle". For example, the driving support ECU 10 determines whether or not a relative position of the target object (n) is within a target vehicle area. The relative position of the target object (n) is determined on the basis of the lateral distance Dfy(n) of the detected target object (n) and the inter-vehicle distance Dfx(n) of the detected target object (n). The target vehicle area is an area previously determined to have a lateral length that becomes smaller as the inter-vehicle distance becomes larger. Then, when the relative position of the target object (n) is within the target vehicle area for a time equal to or longer than a predetermined time, the driving support ECU 10 selects the target object (n) as the target vehicle (a).

Further, the driving support ECU 10 calculates a target acceleration Gtgt in accordance with either one of the following expressions (2) and (3). In the expressions (2) and (3), Vfx(a) is a relative vehicle speed of the target vehicle (a) with respect to the own vehicle, k1 and k2 are predetermined positive gains or coefficients, and $\Delta D1$ is an inter-vehicle distance difference obtained by subtracting a target inter-vehicle distance Dtgt from the inter-vehicle distance Dfx(a) of the target vehicle (a) ($\Delta D1 = Dfx(a) - Dtgt$). The target inter-vehicle distance Dtgt is calculated by multiplying a target inter-vehicle time Ttgt by the vehicle speed SPD of the own vehicle (Dtgt = Ttgt × SPD). The target inter-vehicle time Ttgt is set by the driver using the operation switch 18.

The driving support ECU 10 determines the target acceleration Gtgt in accordance with the following expression (2) when the value (k1 × $\Delta D1$ + k2 × Vfx(a)) is positive or zero. In the expression (2), ka1 is a positive gain or coefficient for accelerating the own vehicle and is set to a value equal to or smaller than "1".

$$Gtgt \text{ (for acceleration)} = ka1 \times (k1 \times \Delta D1 + k2 \times Vfx(a)) \quad (2)$$

On the other hand, when the value (k1 × $\Delta D1$ + k2 × Vfx(a)) is negative, the driving support ECU 10 determines the target acceleration Gtgt in accordance with the following expression (3). In the expression (3), kd1 is a gain or coefficient for decelerating the own vehicle and in this embodiment, is set to "1".

$$Gtgt \text{ (for deceleration)} = kd1 \times (k1 \times \Delta D1 + k2 \times Vfx(a)) \quad (3)$$

When the target vehicle does not exist within the target vehicle area, the driving support ECU 10 determines the target acceleration Gtgt on the basis of the vehicle speed SPD of the own vehicle and a target vehicle speed SPDtgt such that the vehicle speed SPD of the own vehicle becomes equal to the target vehicle speed SPDtgt which is set depending on the target inter-vehicle time Ttgt.

The driving support ECU 10 controls the engine actuators 31 through the engine ECU 30 and if necessary, controls the brake actuator 41 through the brake ECU 40 such that an acceleration of the own vehicle becomes equal to the target acceleration Gtgt. In this manner, the following-travel inter-vehicle-distance control is executed.

<Process for Stopping Vehicle>

Figure 2:
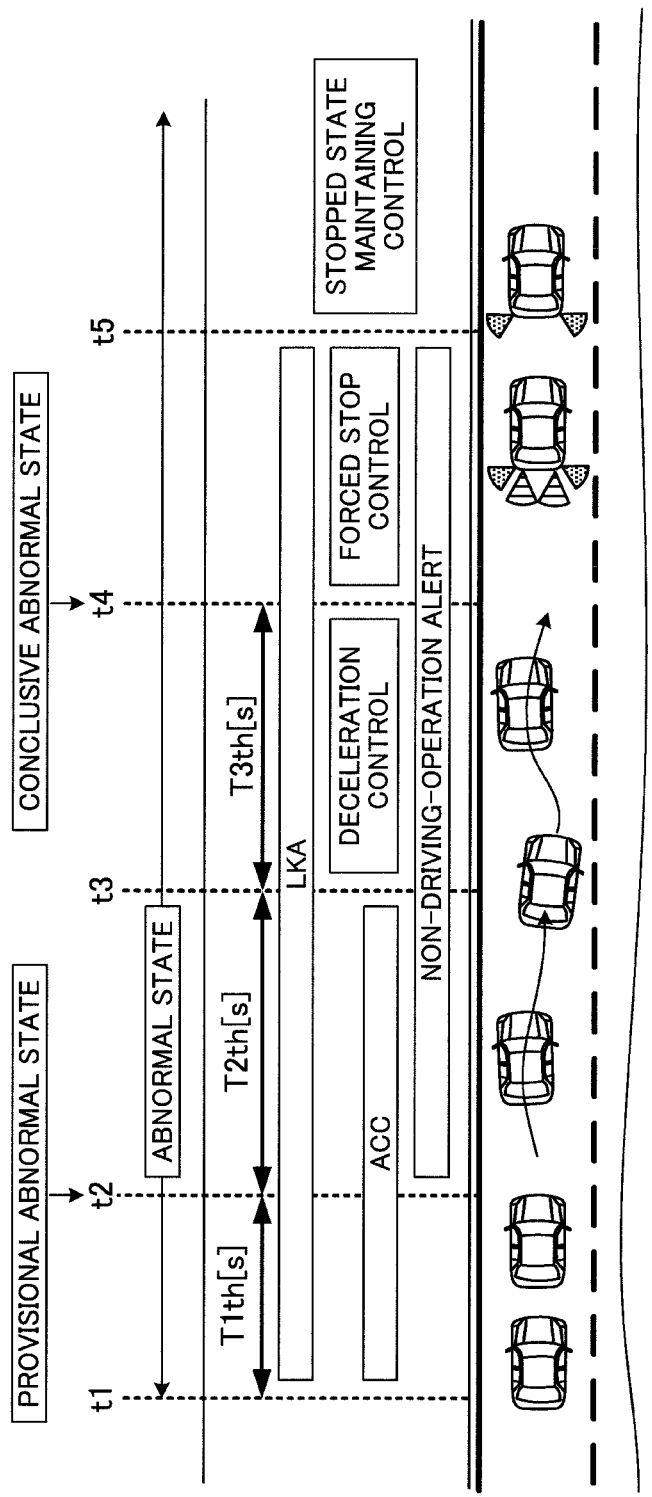
FIG. 2 is a view used for describing an operation of the vehicle traveling control apparatus shown in FIG. 1.

When an abnormal state of the driver continues for a predetermined time T1th from the time t1 in FIG. 2 at which the abnormal state of the driver firstly occurred, the driving support ECU 10 provisionally (tentatively) determines that the driver is under the abnormal state (time t2 in FIG. 2). The predetermined time T1th is referred to as the "first threshold time." That is, in a situation where it is determined that the driver is under the "normal state", the driving support ECU 10 determines that the driver is under the "provisional abnormal state" when the driving support ECU 10 firstly determines that the driver is under the abnormal state at the time t2. Further, in this case, the driving support ECU 10 performs an alerting for urging the driver to perform driving operations.

If the driving support ECU 10 determines that the driver is still under the abnormal state at the time t3 in FIG. 2 at which a predetermined time T2th elapses from the time t2 at which the driver's state was determined to change from the normal state to the provisional abnormal state, the driving support ECU 10 stops the following-travel inter-vehicle-distance control and starts a deceleration control to decrease the vehicle speed SPD of the own vehicle at a predetermined first constant deceleration α1. The predetermined time T2th is referred to as the "second threshold time." At this time, the driving support ECU 10 continues the lane keeping control.

When the driver notices "the alert and/or the deceleration of the own vehicle", and thus, performs the driving operations, the driving support ECU 10 detects the driving operation to determine that the driver's state returns to be the "normal state." In this case, the driving support ECU 10 stops both of the alert for the driver which has been performed and the deceleration of the own vehicle which has been performed. At this time, the driving support ECU 10 continues the lane keeping control and restarts/resumes the following-travel inter-vehicle-distance control.

On the other hand, if the driver does not perform any of the driving operations until a predetermined time T3th elapses at the time t4 in FIG. 2 from the time t3 at which the deceleration control was started, it is likely that the driver is under the abnormal state. In this case, the driving support ECU 10 determines that the driver's state is the "conclusive abnormal state." Hereinafter, the predetermined time T3th will be referred to as the "third threshold time T3th".

Further, the driving support ECU 10 forbids/prohibits the acceleration including the deceleration of the own vehicle owing to a change in/of the acceleration pedal operation amount AP. That is, the driving support ECU 10 forbids an acceleration pedal operation overriding. In other words, the driving support ECU 10 invalidates or ignores a "driving state changing requirement or an acceleration requirement" owing to an operation of the acceleration pedal 11a unless a specific driving operation of the driver is detected.

Therefore, while the driving support ECU 10 forbids the acceleration pedal operation overriding (hereinafter, referred to as the "AOR"), even when a driver requiring torque TQd is larger than zero, the driving support ECU 10 sets a supply requiring torque TQdreq to zero. The driver requiring torque TQd is a torque which the driver requires as a torque to be supplied from the engine 32 to the drive wheels of the own vehicle. The supply requiring torque TQdreq is a torque which the driving support ECU 10 requests the engine 32 to output based on the driver requiring torque TQd.

In this case, the driving support ECU 10 sets an actual requiring torque TQreq, which the driving support ECU 10 requests the engine 32 to actually output, to a minimum engine torque necessary to maintain an operation of the engine 32. That is, the driving support ECU 10 sets the actual requiring torque TQreq to an idling torque. In this case, the engine ECU 30 activates the engine actuators 31 such that the engine 32 outputs a torque corresponding to the actual requiring torque TQreq. Thereby, a torque corresponding to the idling torque is supplied to the drive wheels of the own vehicle.

It should be noted that the driving support ECU 10 acquires the driver requiring torque TQd on the basis of the acceleration pedal operation amount AP. The acquired driver requiring torque TQd increases as the acceleration pedal operation amount AP increases.

In addition, the driving support ECU 10 decelerates, from the time t4, the own vehicle at a predetermined second constant deceleration α2 larger than the predetermined first constant deceleration α1, thereby to forcibly stop the own vehicle.

Hereinafter, the control for forcibly stopping the own vehicle by decelerating the own vehicle at the predetermined second constant deceleration α2 while forbidding the AOR in a situation where the driver's state is determined to be the conclusive abnormal state will be referred to as the "vehicle stop control".

<Stopped State Maintaining Control>

The driving support ECU 10 continues to forbid the AOR, starts a stopped state maintaining control for performing the EPB braking, and stops the hydraulic braking performed using the friction brake mechanism 42 at the time t5 in FIG. 2 at which the driving support ECU 10 has forcibly stopped the own vehicle according to the vehicle stop control. Thereby, after the own vehicle stops, the own vehicle is maintained at a stopped state in which the vehicle continues to stop.

Further, at the time t5 at which the own vehicle is forcibly stopped according to the vehicle stop control, the driving support ECU 10 forbids/prohibits stopping blinking of the hazard lamp 71, and also forbids/prohibits stopping generating the sound from the horn 92. Thereby, after the own vehicle stops, the hazard lamp 71 continues to blink and the horn 92 continues to generate the sounds.

<Permission For Stop/Termination of Stopped State Maintaining Control>

After the own vehicle stops, a rescuer who is rescuing the driver under the abnormal state may mistakenly operate the stop request button 20. In this case, the stopped state maintaining control is requested to be terminated/stopped. At this time, if the driving support ECU 10 permits the termination/stop of the stopped state maintaining control and the acceleration pedal 11a is unintentionally depressed by the driver who is under the conclusive abnormal state, the own vehicle may be suddenly accelerated while the rescuer is rescuing the driver.

In view of the above, the driving support ECU 10 of the embodiment apparatus continues the stopped state maintaining control, if the operation amount AP is equal to or greater than a threshold value even when the termination/stop of the stopped state maintaining control is requested owing to the operation of the stop request button 20 during the execution of the stopped state maintaining control. That is, the driving support ECU 10 continues to forbid the AOR (that is, it forbids permission of the AOR), and to perform the EPB braking (that is, it forbids the termination/stop of the EPB braking). It should be noted that the threshold value may be an arbitrary value larger than zero (in particular, a value close to zero). The threshold value corresponds to a value for determining whether or not the acceleration pedal 11a is in an operated state.

With this configuration of the embodiment apparatus, the AOR continues to be forbidden. Thereby, even when the the acceleration pedal 11a is in the operated state by the driver, the own vehicle can be prevented from being suddenly accelerated. In addition, since the EPB braking continues to be performed, the own vehicle can be prevented from being suddenly accelerated.

Further, the driving support ECU 10 continues to forbid the stop of the blinking of the hazard lamp 71 and the stop of the sound generation performed by the horn 92, if the operation amount AP is equal to or greater than the threshold value even when the stop of the blinking of the hazard lamp 71 and the stop of the sound generation performed by the horn 92 are requested owing to the operation of the stop request button 20 during the execution of the stopped state maintaining control.

Forbidding the stop blinking of the hazard lamp 71 has the hazard lamp 71 continue to blink even when the stop of the blinking of the hazard lamp 71 is requested using the operation of the hazard lamp switch 73. In addition, forbidding the stop generating the sound from the horn 92 has the horn 92 continue to generate the sounds even when the stop of the sound generation performed by the horn 92 is requested using the operation of the horn switch 93.

On the other hand, when the termination/stop of the stopped state maintaining control is requested through the operation of the stop request button 20 during the execution of the stopped state maintaining control, the driving support ECU 10 terminates/stops the stopped state maintaining control if the operation amount AP is smaller than the threshold value. That is, the driving support ECU 10 permits the AOR and permits the stop of EPB braking.

When the AOR is permitted, the driver requiring torque TQd which is acquired based on the operation amount AP is set as the supply requiring torque TQdreq. In addition, the engine actuators 31 are activated such that the engine 32 outputs a torque corresponding to the supply requiring torque TQdreq. Further, since the stop of the EPB braking is permitted, the EPB braking is stopped when the stop of the EPB braking is required through the operation of the canceling switch 53.

Even when the engine 32 is required to output a torque corresponding to the driver requiring torque TQd while the operation amount AP is smaller than the threshold value, it is unlikelky that the own vehicle starts to run. Thus, even when the stop request button 20 is mistakenly operated during the execution of the stopped state maintaining control, the own vehicle can be prevented from being suddenly accelerated.

Further, when the stop of blinking of the hazard lamp 71 and the stop of the sound generation performed by the horn 92 are required through the operation of the stop request button 20 during the execution of the stopped state maintaining control, the driving support ECU 10 permits the stop of the blinking of the hazard lamp 71 and the stop of the sound generation performed by the horn 92, if the operation amount AP is smaller than the threshold value.

With the permission of the stop of the blinking of the hazard lamp 71, the blinking of the hazard lamp 71 is stopped when the stop of the blinking of the hazard lamp 71 is required through the operation of the hazard lamp switch 73. In addition, with the permission of the stop of the sound generation performed by the horn 92, the sound generation performed by the horn 92 is stopped when the stop of the sound generation performed by the horn 92 is required through the operation of the horn switch 93.

The outline of the operation of the embodiment apparatus has been described. Through the operation of the embodiment apparatus, even when the stop request button 20 is mistakenly operated during the execution of the stopped state maintaining control, the own vehicle can be prevented from being suddenly accelerated.

<Concrete Operation of Embodiment Apparatus>

Next, a concrete operation of the embodiment apparatus will be described. The CPU of the driving support ECU 10 of the embodiment apparatus is configured or programmed to execute a normal state routine shown by a flowchart in FIG. 3 every time a predetermined time cycle dT elapses.

Figure 3:
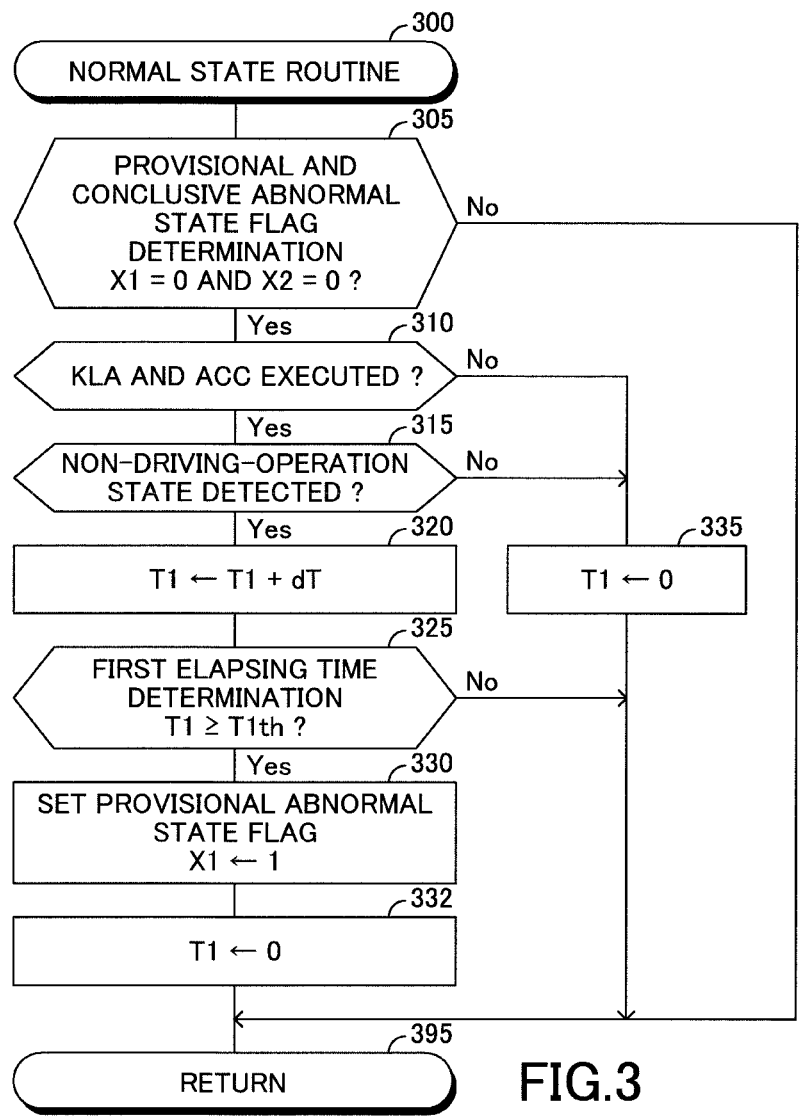
FIG. 3 is a flowchart for showing a normal state routine executed by a CPU of a driving support ECU shown in FIG. 1.

Therefore, at a predetermined timing, the CPU starts the routine from step 300 shown in FIG. 3 and then, proceeds to step 305 to determine whether or not values of a provisional abnormal state flag X1 and a conclusive abnormal state flag X2 are both "0".

The CPU monitors the driver's state to determine which the driver's state is, the "normal state", the "provisional abnormal state", and the "conclusive abnormal state", based on a monitoring result. The provisional abnormal state flag X1 indicates that the driver's state is determined to be the provisional abnormal state when the value of the provisional abnormal state flag X1 is "1". The conclusive abnormal state flag X2 indicates that the driver's state is determined to be the conclusive abnormal state when the value of the conclusive abnormal state flag X2 is "1". When the values of the provisional and conclusive abnormal state flags X1 and X2 are both "0", the flags X1 and X2 indicate that the driver's state at the present time is determined to be the normal state.

The values of the provisional and conclusive abnormal state flags X1 and X2 are initialized to be set to "0", respectively, when an ignition switch (not shown) is turned ON.

Thus, immediately after the ignition switch is turned ON, the values of the provisional and conclusive abnormal state flags X1 and X2 are both "0". Accordingly, the CPU makes a "Yes" determination at step 305 to proceed to step 310 at which the CPU determines whether or not both of the lane keeping control (LKA) and the following-travel inter-vehicle-distance control (ACC) are being executed.

When both of the lane keeping control and the following-travel inter-vehicle-distance control are being executed, the CPU makes a "Yes" determination at step 310 to proceed to step 315 at which the CPU determines whether or not a non-driving-operation state that the driver does not perform any driving operations is detected.

The non-driving-operation state is a state that any one or more of parameters including "the acceleration pedal operation amount AP, the brake pedal operation amount BP, the actual steering torque Tra, and the signal level of the stop lamp switch 13" that are changed owing to the driving operation of the driver does/do not change. In this embodiment, the CPU regards a "state that any one of the acceleration pedal operation amount AP, the brake pedal operation amount BP, and the actual steering torque Tra does not change, and the actual steering torque Tra continues to be zero" as the non-driving-operation state.

When the non-driving-operation state is detected, the CPU makes a "Yes" determination at step 315 to execute a process of step 320 described below. Then, the CPU proceeds to step 325.

Step 320: The CPU increases a time T1 by a predetermined time dT. The predetermined time dT is a time corresponding to the execution cycle (the predetermined time cycle dT) of the normal state routine of FIG. 3. Hereinafter, the time T1 will be referred to as "the first elapsing time T1". The time T1 represents a time duration which has elapsed from a time point at which the non-driving-operation state was firstly detected at step 315.

When the CPU proceeds to step 325, the CPU determines whether or not the first elapsing time T1 is equal to or larger than the first threshold time T1th. Immediately after the CPU makes a "Yes" determination at step 315, the first elapsing time T1 is smaller than the first threshold time T1th. In this case, the CPU makes a "No" determination at step 325 and then, proceeds to step 395 to tentatively terminate the present routine.

On the other hand, when the non-driving-operation state continues until the first elapsing time T1 becomes equal to or larger than the first threshold time T1th, the CPU makes a "Yes" determination at step 325 to sequentially execute processes of steps 330 and 332 described below. Thereafter, the CPU proceeds to step 395 to tentatively terminate the present routine.

Step 330: The CPU sets the value of the provisional abnormal state flag X1 to "1". The time point at which the provisional abnormal state flag X1 is set to "1" is the time point at which the driving support ECU 10 initially/firstly determines that the state of the driver is the abnormal state. After the value of the provisional abnormal state flag X1 is set to "1", the CPU makes a "No" determination at step 305 and makes a "Yes" determination at step 405 in FIG. 4 described later. Therefore, in place of the normal state routine shown in FIG. 3, a provisional abnormal state routine shown in FIG. 4 substantially functions.

Step 332: The CPU clears the first elapsing time T1 (i.e., sets the first elapsing time T1 to zero). It should be noted that the first elapsing time T1 is set to zero when the ignition switch is turned ON.

When any of the lane keeping control and the following-travel inter-vehicle-distance control is not being executed upon executing the process of step 310, the CPU makes a "No" determination at step 310 and then, executes a process of step 335 described below. Thereafter, the CPU proceeds to step 395 to tentatively terminate the present routine. Further, when the non-driving-operation state is not detected upon executing the process of step 315, the CPU makes a "No" determination at step 315 and then, executes the process of step 335. Thereafter, the CPU proceeds to step 395 to tentatively terminate the present routine.

Step 335: The CPU clears the first elapsing time T1 (i.e., sets the first elapsing time T1 to zero).

In addition, when any of the values of the provisional and conclusive abnormal state flags X1 and X2 is "1" upon executing the process of step 305, the CPU makes a "No" determination at step 305 to proceed directly to step 395 to tentatively terminate the present routine.

Figure 4:
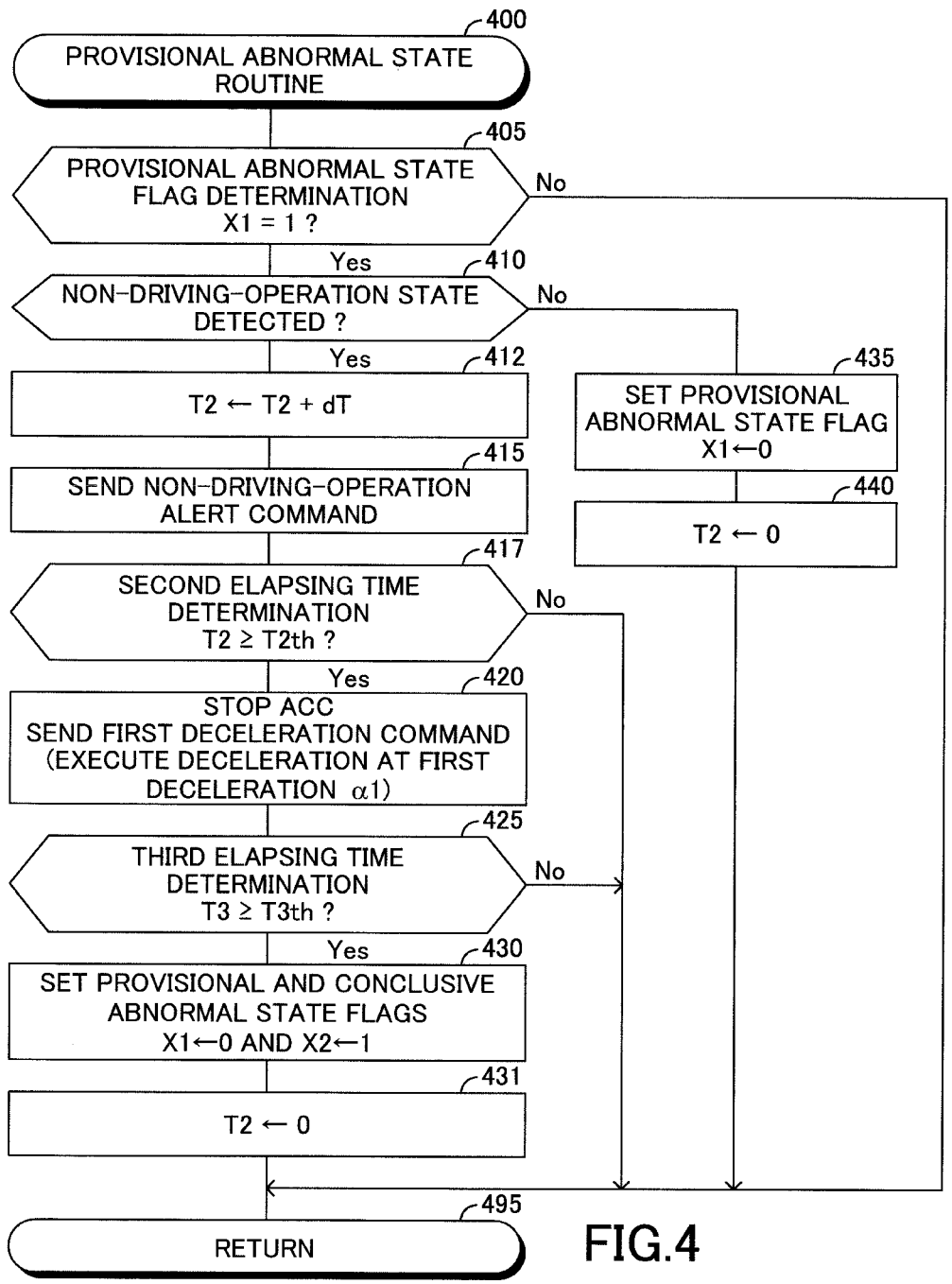
FIG. 4 is a flowchart for showing a provisional abnormal state routine executed by the CPU shown in FIG. 1.

Further, the CPU is configured or programmed to execute the provisional abnormal state routine shown by the flowchart in FIG. 4 every time the predetermined time cycle dT elapses. Therefore, at a predetermined timing, the CPU starts a process from step 400 in FIG. 4 to proceed to step 405 at which the CPU determines whether or not the value of the provisional abnormal state flag X1 is "1". When the value of the provisional abnormal state flag X1 has been set to "1" by the process of step 330 in FIG. 3, that is, when the driver's state has been determined to be the provisional abnormal state, the CPU makes a "Yes" determination at step 405 to proceed to step 410.

At step 410, the CPU determines whether or not the non-driving-operation state is detected. This determination is the same as the determination at step 315 in FIG. 3. When the non-driving-operation state is detected, the CPU makes a "Yes" determination at step 410 to sequentially execute processes of steps 412 and 415 described below. Thereafter, the CPU proceeds to step 417.

Step 412: The CPU increases a time T2 by a predetermined time dT. The predetermined time dT is a time corresponding to the execution cycle (the predetermined time cycle dT) of the provisional abnormal state routine of FIG. 4. Hereinafter, the time T2 will be referred to as "the second elapsing time T2". The time T2 represents a time duration which has elapsed from a time point at which the driver's state is determined to be the provisional abnormal state.

Step 415: The CPU sends a non-driving-operation alert command to the alert ECU 80. Thereby, the alert ECU 80 has the buzzer 81 generate the alerting sounds, and has the display device 82 blink the warning lamp and display the alerting message for urging/prompting the driver to operate any of the acceleration pedal 11a, the brake pedal 12a, and the steering wheel SW.

When the CPU proceeds to step 417, the CPU determines whether or not the second elapsing time T2 is equal to or larger than the second threshold time T2th. The second elapsing time T2 is smaller than the second threshold time T2th immediately after the value of the provisional abnormal state flag X1 is set to "1" at step 330 in FIG. 3 (or immediately after the driver's state is determined to be the provisional abnormal state). In this case, the CPU makes a "No" determination at step 417 to proceed to step 495 to tentatively terminate the present routine.

In contrast, when the drivers state continues to be determined to be the provisional abnormal state until the second elapsing time T2 becomes equal to or larger than the second threshold time T2th, the CPU makes a "Yes" determination at step 417 to execute a process of step 420 described below. Thereafter, the CPU proceeds to step 425.

Step 420: The CPU terminates/stops the following-travel inter-vehicle-distance control (ACC) and sends, to the engine and brake ECUs 30 and 40, a first deceleration command for having the engine and brake ECUs 30 and 40 execute the deceleration control to decelerate the own vehicle at the predetermined first constant deceleration al. In this case, the CPU calculates the acceleration of the own vehicle on the basis of a change amount per unit time of the vehicle speed SPD acquired on the basis of the detection signal sent from the vehicle speed sensor 16, and sends, to the engine and brake ECUs 30 and 40, a command signal for having the calculated acceleration match with the predetermined first constant deceleration $\alpha 1$. In this embodiment, the predetermined first constant deceleration al is set to a deceleration having an extremely small absolute value.

When the CPU proceeds to step 425, the CPU determines whether or not a time T3 is equal to or larger than the third threshold time T3th. The time T3 represents a time duration which has elapsed from the time point at which the deceleration control was started at step 420. The time T3 is acquired by subtracting the second threshold time T2th from the second elapsing time T2 (T3=T2−T2th). Hereinafter, the time T3 will be referred to as "the third elapsing time T3".

Immediately after the process of step 420 is firstly executed, that is, immediately after the deceleration control is started, the third elapsing time T3 is smaller than the third threshold time T3th. In this case, the CPU makes a "No" determination at step 425, and proceeds to step 495 to tentatively terminate the present routine.

On the other hand, when the driver's state continues to be determined to be the provisional abnormal state until the third elapsing time T3 becomes equal to or larger than the third threshold time T3th, the CPU makes a "Yes" determination at step 425 to sequentially execute processes of steps 430 and 431 described below. Thereafter, the CPU proceeds to step 495 to tentatively terminate the present routine.

Step 430: The CPU sets the value of the provisional abnormal state flag X1 to "0" and sets the value of the conclusive abnormal state flag X2 to "1". Thereby, the CPU makes a "No" determination at step 405 and makes a "Yes" determination at step 505 in FIG. 5 described later. In this case, in place of the provisional abnormal state routine shown in FIG. 4, a conclusive abnormal state routine shown in FIG. 5 substantially functions.

Step 431: The CPU clears the second elapsing time T2 (i.e., sets the second elapsing time T2 to zero). It should be noted that the second elapsing time T2 is also cleared when the ignition switch is turned ON.

When the driving operation by the driver is detected upon executing the process of step 410, the CPU makes a "No" determination at step 410 to sequentially execute processes of steps 435 and 440 described below. Thereafter, the CPU proceeds to step 495 to tentatively terminate the present routine.

Step 435: The CPU sets the value of the provisional abnormal state flag X1 to "0". Thereby, the values of the provisional and conclusive abnormal state flags X1 and X2 become both set to "0". That is, the driver's state is determined to be the normal state. In this case, the CPU makes a "Yes" determination at step 305 in FIG. 3. Thus, in place of the provisional abnormal state routine shown in FIG. 4, the normal state routine shown in FIG. 3 described above substantially functions.

Step 440: The CPU clears the second elapsing time T2 (i.e., sets the second elapsing time T2 to zero).

Further, when the value of the provisional abnormal state flag X1 is "0" upon executing the process of step 405, the CPU makes a "No" determination at step 405 to proceed directly to step 495 to tentatively terminate the present routine.

Figure 5:
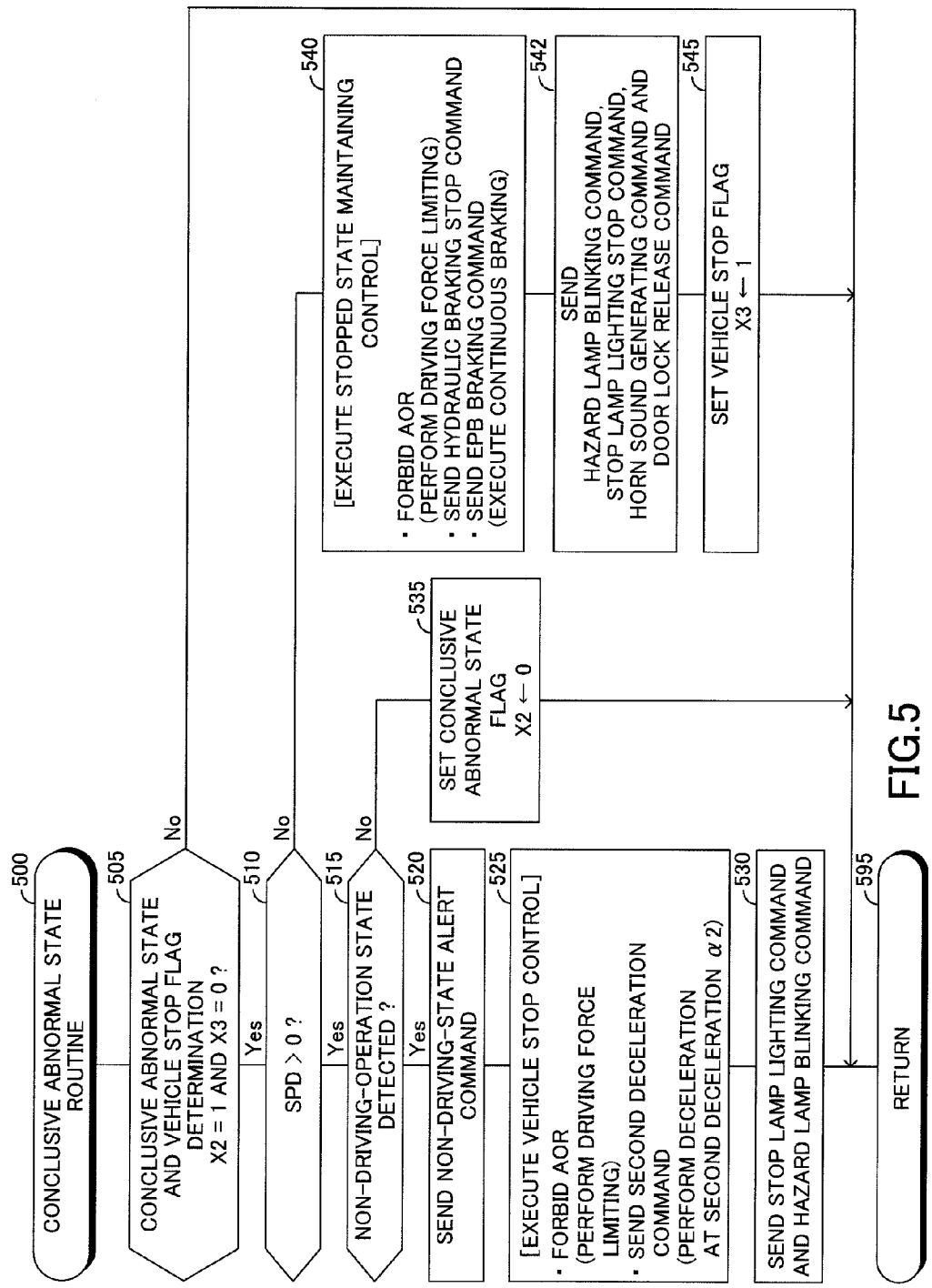
FIG. 5 is a flowchart for showing a conclusive abnormal state routine executed by the CPU shown in FIG. 1.

Further, the CPU is configured or programmed to execute the conclusive abnormal state routine shown by a flowchart in FIG. 5 every time the predetermined time cycle dT elapses. Therefore, at a predetermined timing, the CPU starts a process from step 500 to proceed to step 505 at which the CPU determines whether or not the value of the conclusive abnormal state flag X2 is "1" and a value of a vehicle stop flag X3 is "0".

The value of the vehicle stop flag X3 is set to "1" by a process of step 545 described later, when the CPU makes a "No" determination at step 510 described later after the own vehicle is forcibly stopped by a process of step 525 described later. The value of the vehicle stop flag X3 is set to "0" by a process of step 625 in FIG. 6 described later, when the termination/stop of the stopped state maintaining control is permitted by a process of step 620 in FIG. 6 described later after the stopped state maintaining control starts.

Since the own vehicle does not stop immediately after the value of the conclusive abnormal state flag X2 is set to "1" at step 430 in FIG. 4, the value of the vehicle stop flag X3 is "0". In this case, the CPU makes a "Yes" determination at step 505 to proceed to step 510.

At step 510, the CPU determines whether or not the vehicle speed SPD is larger than zero, that is, the own vehicle travels. When the process of step 510 is firstly executed, the own vehicle does not stop. In this case, the CPU makes a "Yes" determination at step 510 to proceed to step 515.

At step 515, the CPU determines whether or not the non-driving-operation state is detected. The prosses of step 515 may be the same as the processes of step 315 in FIG. 3 and step 410 in FIG. 4. The prosses of step 515 may include a condition to more certainly detects the driving operation.

When the non-driving-operation state is detected, the CPU makes a "Yes" determination at step 515 to sequentially execute processes of steps 520 to 530 described below. Thereafter, the CPU proceeds to step 595 to tentatively terminate the present routine.

Step 520: The CPU sends the non-driving-operation alert command to the alert ECU 80. Thereby, the alert ECU 80 performs the non-driving-operation alert using the buzzer 81 and the display device 82. The non-driving-operation alert performed at step 520 may be the same as the non-driving-operation alert performed at step 415 in FIG. 4 or may be different in that the alert is enhanced compared with the non-driving-operation alert performed at step 415 (for example, a volume of the sound generated by the buzzer 81 may be increased).

Step 525 : The CPU executes the vehicle stop control. More specifically, the CPU forbids the AOR, and sends, to the brake ECU 40, a second deceleration command for having the brake ECU 40 decelerate the own vehicle at the predetermined second constant deceleration α2.

In a state in which the CPU forbids the AOR, the CPU sets the supply requiring torque TQdreq to zero and sends, to the engine ECU 30, an output command for having the engine 32 output a torque corresponding to the idling torque even when the acceleration pedal operation amount AP is larger than zero, that is, the driver requiring torque TQd (i.e., the value of the driver requiring driving force) is larger than zero. When receiving the output command, the engine ECU 30 activates the engine actuators 31 such that the engine 32 outputs the torque corresponding to the idling torque.

When receiving the second deceleration command, the brake ECU 40 activates the brake actuator 41 such that the own vehicle is decelerated at the predetermined second constant deceleration α2. In this embodiment, the predetermined second constant deceleration α2 is set such that the absolute value of the predetermined second constant deceleration α2 is larger than the absolute value of the predetermined first constant deceleration α1.

Step 530: The CPU sends, to the meter ECU 70, a lighting command for lighting the stop lamp 72 and a blinking command for blinking the hazard lamp 71. Thereby, the meter ECU 70 lights the stop lamp 72 and blinks the hazard lamp 71. As a result, a driver of a vehicle following the own vehicle can be alerted.

The driving support ECU 10 repeatedly executes the aforementioned processes to decelerate the own vehicle.

When the driving operation of the driver is detected upon executing the process of step 515, the CPU makes a "No" determination at step 515 to execute a process of step 535 described below. Thereafter, the CPU proceeds to step 595 to tentatively terminate the present routine.

Step 535 : The CPU sets the value of the conclusive abnormal state flag X2 to "0". Thereby, the deceleration control, the alert for the driver of the own vehicle, and the alert for the driver of the vehicle following the own vehicle are terminated/stopped, and a normal vehicle control for controlling the travel of the own vehicle only on the basis of the driving operation of the driver of the own vehicle is started. Therefore, the lane keeping control and the following-travel inter-vehicle-distance control are or are not executed, depending on the setting states of the operation switch 18.

It should be noted that the CPU may be configured or programmed not to execute the process of step 535 when the driving operation by the driver of the own vehicle is detected while executing the vehicle stop control. For example, when the driving operation by the driver of the own vehicle is detected while executing the vehicle stop control, the CPU may be configured or programmed to continue to decelerate the own vehicle at the predetermined second constant deceleration α2 while forbidding the AOR, and thereafter set the value of the conclusive abnormal state flag X2 to "0" when the own vehicle is stopped.

The CPU makes a "No" determination at step 510 to sequentially execute processes of steps 540 to 545 described below, when a state in which the driving operation of the driver is not detected continues until the own vehicle is stopped (that is, the vehicle speed SPD of the own vehicle becomes zero) through the deceleration at the predetermined second constant deceleration α2. Threafter, the CPU proceeds to step 595 to tentatively terminate the present routine.

Step 540: The CPU executes the stopped state maintaining control. Specifically, the CPU forbids the AOR, sends a hydraulic braking stop command to the brake ECU 40, and sends an EPB braking command to the electric powered parking brake ECU 50.

In the state in which the CPU forbids the AOR, the CPU sets the supply requiring torque TQdreq to zero and sends, to the engine ECU 30, the output command for having the engine 32 output the torque corresponding to the idling torque even when the acceleration pedal operation amount AP is larger than zero, that is, the driver requiring torque TQd (i.e., the value of the driver requiring driving force) is larger than zero. When receiving the output command, the engine ECU 30 activates the engine actuators 31 such that the engine 32 outputs the torque corresponding to the idling torque.

When receiving the hydraulic braking stop command, the brake ECU 40 has the friction brake mechanism 42 stop the hydraulic braking. When receiving the EPB braking command, the electric powered parking brake ECU 50 activates the parking brake actuator 51 to perform the EPB braking (i.e., a continuous braking).

Step 542: The CPU sends a hazard lamp blinking command and a stop lamp lighting stop command to the meter ECU 70, and sends a horn sound generation command and a door lock release command to the body ECU 90.

When receiving the hazard lamp blinking command and the stop lamp lighting stop command, the meter ECU 70 blinks the hazard lamp 71 and stops the lighting of the stop lamp 72. When receiving the horn sound generation command and the door lock release command, the body ECU 90 has the horn 92 generate the sound, and has the door lock device 91 release the door lock.

Step 545: The CPU sets the value of the vehicle stop flag X3 to "1". The vehicle stop flag X3 indicates that the own vehicle is forcibly stopped by the vehicle stop control when the value of the vehicle stop flag X3 is "1".

Figure 6:
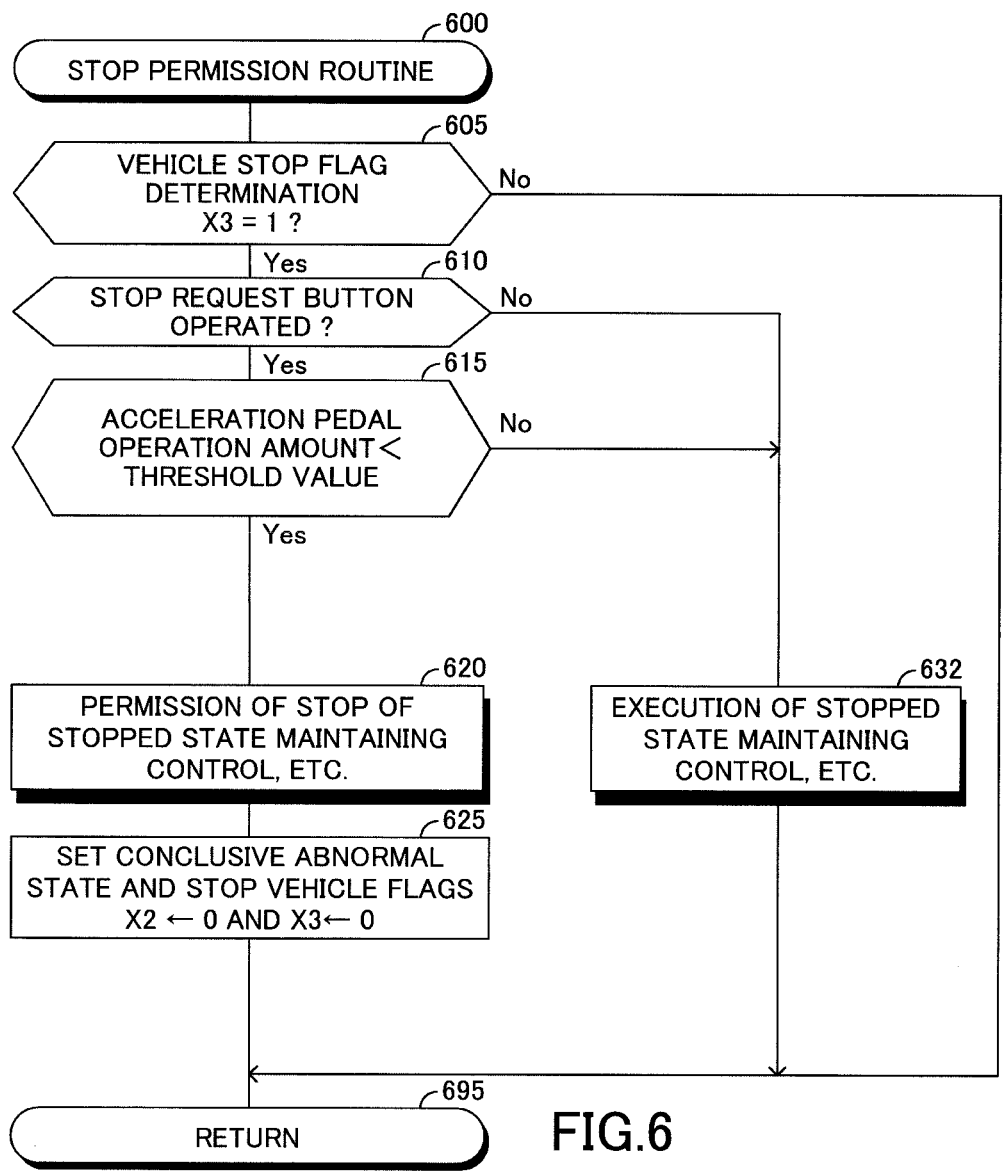
FIG. 6 is a flowchart for showing a stop permission routine executed by the CPU shown in FIG. 1.

Further, the CPU is configured or programmed to execute a stop permission routine shown by a flowchart in FIG. 6 every time the predetermined time cycle dT elapses. Therefore, at a predetermined timing, the CPU starts a process from step 600 to proceed to step 605 at which the CPU determines whether or not the value of the vehicle stop flag X3 is "1". When the value of the vehicle stop flag X3 is "1", the CPU makes a "Yes" determination at step 605 to proceed to step 610 at which the CPU determines whether or not the stop request button 20 is operated after the own vehicle is stopped through the process of step 525 in FIG. 5.

When the stop request button 20 is operated after the own vehicle is stopped, the CPU makes a "Yes" determination at step 610 to proceed to step 615 at which the CPU determines whether or not the operation amount AP is smaller than the threshold value.

When the operation amount AP is smaller than the threshold value, the CPU makes a "Yes" determination at step 615 to sequentially execute processes of steps 620 and 625 described below. Thereafter, the CPU proceeds to step 695 to tentatively terminate the present routine.

Step 620: The CPU executes a routine shown by a flowchart in FIG. 7 to permit the termination/stop of the stopped state maintaining control and the like. Therefore, when the CPU proceeds to step 620, the CPU starts a process from step 700 to sequentially execute processes of steps 710 and 720 described below.

Step 710: The CPU permits the termination/stop of the stopped state maintaining control. Specifically, the CPU permits the AOR, and sends an EPB braking stop permission command to the electric powered parking brake ECU 50.

When permitting the AOR, the CPU sets the driver requiring torque TQd as the supply requiring torque TQdreq, and sends, to the engine ECU 30, the output command for having the engine 32 output the torque corresponding to the supply requiring torque TQdreq. When receiving the output command, the engine ECU 30 activates the engine actuators 31 such that the engine 32 outputs the torque corresponding to the supply requiring torque TQdreq. When the cancelling switch 53 is operated after the electric powered parking brake ECU 50 receives the EPB braking stop permission command, the electric powered parking brake ECU 50 stops the EPB braking. Thereby, the stopped state maintaining control is terminated.

Step 720: The CPU sends a hazard lamp blinking stop permission command to the meter ECU 70, and sends a horn sound-generation stop permission command to the body ECU 90.

When the hazard lamp switch 73 is operated after the meter ECU 70 receives the hazard lamp blinking stop permission command, the meter ECU 70 stops blinking the hazard lamp 71. When the horn switch 93 is operated after the body ECU 90 receives the horn sound-generation stop permission command, the body ECU 90 stops generating the sound from the horn 92.

After the CPU executes the process of step 720, the CPU returns to the routine shown in FIG. 6 via step 795 to execute a process of step 625 described below. Thereafter, the CPU proceeds to step 695 to tentatively terminate the present routine.

Step 625: The CPU sets the values of the conclusive abnormal state and vehicle stop flags X2 and X3 to "0", respectively.

On the other hand, when the operation amount AP is equal to or greater than the threshold value upon executing the process of step 615, the CPU makes a "No" determination at step 615 to execute a process of step 632 described below.

Step 632: The CPU executes the stopped state maintaining control and the like by executing a routine shown by a flowchart in FIG. 8.

Therefore, when the CPU proceeds to step 632, the CPU starts a process from step 800 to sequentially execute processes of steps 810 and 820 described below.

Step 810: The CPU executes the stopped state maintaining control. Specifically, the CPU forbids the AOR, and sends the EPB braking command to the electric powered parking brake ECU 50.

In a case where the CPU forbids the AOR, the CPU sets the supply requiring torque TQdreq to zero even when the value of the driver requiring torque TQd (i.e., the driver requiring driving force) is larger than zero, and sends, to the engine ECU 30, the output command for having the engine 32 output the torque corresponding to the idling torque. When receiving the output command, the engine ECU 30 activates the engine actuators such that the engine 32 outputs the torque corresponding to the idling torque. When receiving the EPB braking command, the electric powered parking brake ECU 50 activates the parking brake actuator 51 to perform the EPB braking (i.e., the continuous braking).

Step 820: The CPU sends the hazard lamp blinking command to the meter ECU 70 and sends the horn sound generating command to the body ECU 90.

When receiving the hazard lamp blinking command, the meter ECU 70 blinks the hazard lamp 71. When receiving the horn sound generating command, the body ECU 90 has the horn 92 generate the sounds.

After the CPU executes the process of step 820, the CPU returns to the routine shown in FIG. 6 via step 895, and then proceeds to step 695 to tentatively terminate the present routine.

When the value of the vehicle stop flag X3 is "0" upon executing the process of step 605, the CPU makes a "No" determination at step 605 to proceed directly to step 695 at which the CPU tentatively terminates the present routine. When the stop request button 20 is not operated upon executing the process of step 610, the CPU executes the process of step 632 to proceed to step 695 at which the CPU tentatively terminate the present routine.

The specific operation of the embodiment apparatus has been described. According to the routines of FIGS. 3 to 5, when the driver is under the abnormal state that the driver loses the ability to drive the own vehicle (refer to the "Yes" determination at step 515 in FIG. 5), the driving support ECU 10 can decelerate the own vehicle to stop the own vehicle (refer to step 525).

Figure 7:
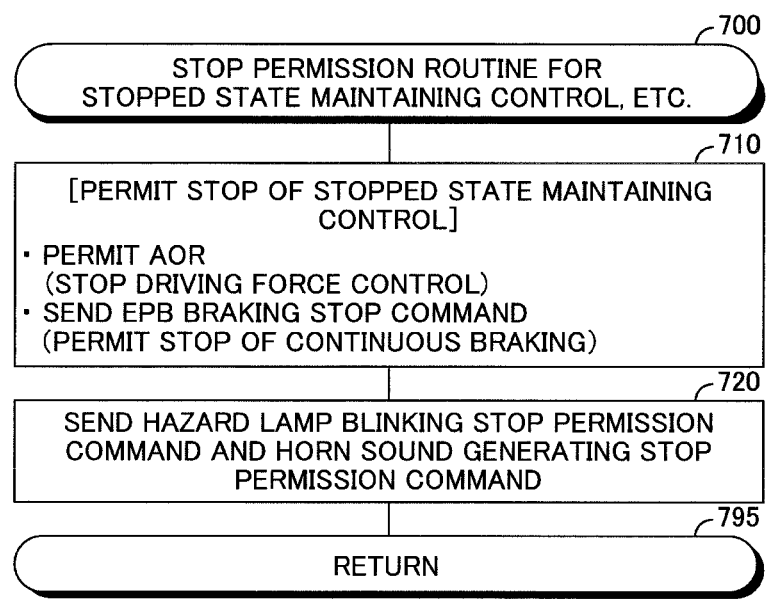
FIG. 7 is a flowchart for showing a stop permission routine for a stopped state maintaining control, etc executed by the CPU shown in FIG. 1.
Figure 8:
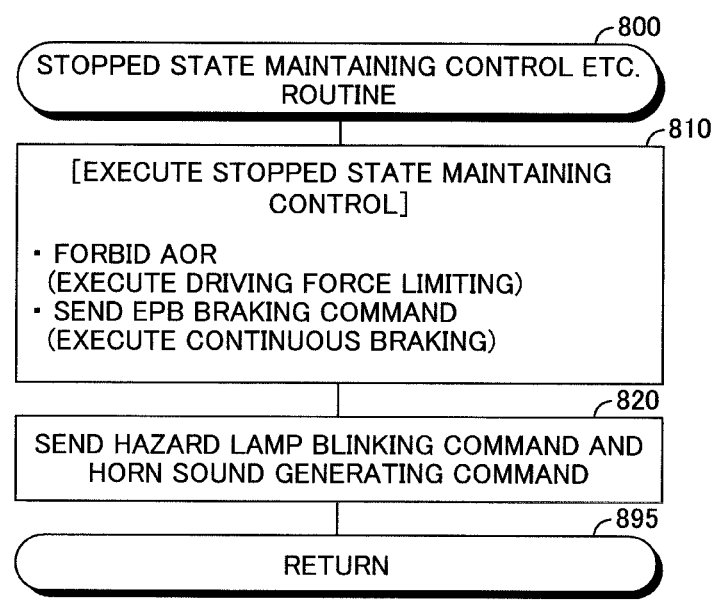
FIG. 8 is a flowchart for showing a stopped state maintaining control, etc routine executed by the CPU shown in FIG. 1.

Further, according to the routines of FIGS. 6 to 8, even when the termination/stop of the stopped state maintaining control is requested during the execution of the stopped state maintaining control (refer to the "Yes" determination at step 610 in FIG. 6), the AOR continues to be forbidden and the EPB braking continues to be performed (refer to step 632 in FIG. 6, and step 810 in FIG. 8) if the acceleration pedal operation amount is equal to or greater than the threshold value (refer to the "No" determination at step 615). Thereby, the own vehicle can be prevented from being suddenly accelerated.

<Modifications>

It should be noted that the present disclosure is not limited to the aforementioned embodiment, and thus, various modifications can be employed within the scope of the present disclosure.

For example, in the above embodiment, the stop request button 20 is operated to request the termination/stop of the stopped state maintaining control. However, a condition which must be satisfied to terminate/stop the stopped state maintaining control is not limited to the above example, and various conditions can be adopted.

For example, the request for terminating/stopping the stopped state maintaining control may be made when a specific operation of the acceleration pedal 11a is conducted.

Such a specific operation of the acceleration pedal 11a may include an operation in which the acceleration pedal 11a is once operated, and then is not operated, and thereafter, is operated again within a predetermined time.

In this case, the stop permission routine shown in FIG. 6 can be modified as follows. That is, the step 610 shown in FIG. 6 is replaced with a step for "determining whether or not the specific operation of the acceleration pedal 11a is conducted". When the CPU makes a "Yes" determination at this step, the CPU proceeds to step 615. On the other hand, when the CPU makes a "No" determination at this step, the CPU proceeds to step 632.

The embodiment apparatus sets the supply requiring torque TQdreq (i.e., the supply requiring driving force) to zero to forbid the AOR, even when the driver requiring torque TQd (i.e., the driver requiring driving force) is larger than zero. Instead, the embodiment apparatus may be configured to perform a torque limiting control (driving force limiting control) to set the supply requiring torque TQdreq to a relatively small value larger than zero and smaller than or equal to a torque TQ0 which is smaller than the driver requiring torque TQd.

Specifically, the embodiment apparatus may be configured or programmed to execute the stopped state maintaining control for maintaining the own vehicle at the stopped state by performing the EPB braking and the torque limiting control for limiting the supply requiring torque TQdreq (i.e., the supply requiring driving force) to a torque which is equal to or smaller than the torque TQ0 smaller than the driver requiring torque TQd (i.e., the driver requiring driving force) when the own vehicle is stopped by the vehicle stop control. In some embodiments, the torque TQ0 is set to a positive value close to zero and larger than zero.

The embodiment apparatus performs the abnormal determination of the driver on the basis of the time of the continuation of the non-driving-operation state, however the embodiment apparatus may be configured or programmed to perform the abnormal determination of the driver by using so-called driver monitor technique, for example, described in JP 2013-152700 A. In this case, a camera for taking an image of the driver of the own vehicle is provided on a member (for example, the steering wheel, a pillar and the like) inside the own vehicle. The driving support ECU 10 monitors a direction of a line of sight of the driver or the face of the driver by using the image taken by the camera. The driving support ECU 10 determines that the driver is under the abnormal state when the direction of the line of the sight of the driver or the face of the driver continues to be a direction to which the line of the sight of the driver or the face of a driver under the normal state does not direct for over a predetermined time. This abnormal state determination using the image taken by the camera can be used for the determination of the provisional abnormal state (refer to the process of step 315 in FIG. 3) and the determination of the conclusive abnormal state (refer to the process of step 410 in FIG. 4).

Further, the embodiment apparatus may be configured or programmed to continuously determine whether or not the driver of the own vehicle is under the abnormal state using a confirmation button (not shown) provided inside the own vehicle. More specifically, the driving support ECU may prompt/urge the driver of the own vehicle to operate the confirmation button with a display image and/or a voice message every time a first time elapses, and may determine that the driver is under the provisional abnormal state when a state where no operation of the confirmation button is made continues for a provisional abnormality determination time t1ref or more. The determination time t1ref is longer than the first time. Further, after it is determined that the driver is under the provisional abnormal state, the driving support ECU 10 may prompt/urge the driver of the own vehicle to operate the confirmation button with a display image and/or a voice message every time the first time elapses, and may determine that the driver is under the conclusive abnormal state when the state where no operation of the confirmation button is made continues for the conclusive abnormality determination time t2ref or more. The determination time t2ref is longer than the first time.

What is claimed is:

1. A vehicle traveling control apparatus applied to a vehicle, said vehicle including:
   an engine that supplies, to drive wheels of said vehicle, a driving force for traveling said vehicle;
   a brake actuator that applies a braking force to said vehicle; and
   an acceleration pedal operation amount detecting sensor that detects an acceleration pedal operation amount of said vehicle,
   said vehicle traveling control apparatus comprising an electric control unit which is configured:
   to continuously determine whether or not a driver of said vehicle is under an abnormal state that said driver loses an ability of driving said vehicle; and
   to execute a vehicle stop control for having said brake actuator apply said braking force to said vehicle to stop said vehicle after said electric control unit determines that said driver is under said abnormal state,
   wherein,
   said electric control unit is configured:
   to acquire a driver requiring driving force which is a driving force required by said driver and is decided on the basis of said acceleration pedal operation amount;
   to execute a stopped state maintaining control for maintaining said vehicle at a stopped state by performing a driving force limiting control for limiting a supply requiring driving force which said engine is requested to supply to said drive wheels on the basis of said driver requiring driving force to a value equal to or smaller than a driving force which is smaller than said driver requiring driving force, and by performing a continuous braking to continuously apply said braking force to said vehicle from said brake actuator, while said vehicle is stopped through said vehicle stop control; and
   to forbid a termination of said stopped state maintaining control when (i) said acceleration pedal operation amount is equal to or greater than a threshold value larger than zero and (ii) said termination of said stopped state maintaining control is requested during executing said stopped state maintaining control.

2. The vehicle traveling control apparatus according to claim 1, wherein,
   said electric control unit is configured to permit said termination of said stopped state maintaining control when (iii) said acceleration pedal operation amount is smaller than said threshold value and (iv) said termination of said stopped state maintaining control is requested during executing said stopped state maintaining control.

3. The vehicle traveling control apparatus according to claim 1,
   wherein the vehicle further includes a stop request button,
   wherein said electric control unit is configured in such a manner that said termination of said stopped state maintaining control is requested when the stop request button is operated.

4. A vehicle traveling control apparatus applied to a vehicle, said vehicle including:
   an engine that supplies, to drive wheels of said vehicle, a driving force for traveling said vehicle;
   a brake actuator that applies a braking force to said vehicle; and
   an acceleration pedal operation amount detecting sensor that detects an acceleration pedal operation amount of said vehicle,
   said vehicle traveling control apparatus comprising an electric control unit which is configured:
   to continuously determine whether or not a driver of said vehicle is under an abnormal state that said driver loses an ability of driving said vehicle; and
   to execute a vehicle stop control for having said brake actuator apply said braking force to said vehicle to stop said vehicle after said electric control unit determines that said driver is under said abnormal state,
   wherein,
   said electric control unit is configured:
   to acquire a driver requiring driving force which is a driving force required by said driver and is decided on the basis of said acceleration pedal operation amount;
   to execute a stopped state maintaining control for maintaining said vehicle at a stopped state by performing a driving force limiting control for limiting a supply requiring driving force which said engine is requested to supply to said drive wheels on the basis of said driver requiring driving force to a value equal to or smaller than a driving force which is smaller than said driver requiring driving force, and by performing a continuous braking to continuously apply said braking force to said vehicle from said brake actuator, while said vehicle is stopped through said vehicle stop control; and
   to forbid a termination of said stopped state maintaining control when said acceleration pedal operation amount is equal to or greater than a threshold value larger than zero, when said termination of said stopped state maintaining control is requested during executing said stopped state maintaining control,
   wherein said electric control unit is configured in such a manner that said termination of said stopped state maintaining control is requested when a specific operation of said acceleration pedal is conducted.

5. The vehicle traveling control apparatus according to claim 4, wherein,
   said electric control unit is configured to permit said termination of said stopped state maintaining control when said acceleration pedal operation amount is smaller than said threshold value, when said termination of said stopped state maintaining control is requested during executing said stopped state maintaining control.

6. A vehicle traveling control apparatus applied to a vehicle, said vehicle including:
   an engine that supplies, to drive wheels of said vehicle, a driving force for traveling said vehicle;
   a brake actuator that applies a braking force to said vehicle;

an acceleration pedal operation amount detecting sensor that detects an acceleration pedal operation amount of said vehicle; and a stop request button, said vehicle traveling control apparatus comprising an electric control unit which is configured:

to continuously determine whether or not a driver of said vehicle is under an abnormal state that said driver loses an ability of driving said vehicle; and to execute a vehicle stop control for having said brake actuator apply said braking force to said vehicle to stop said vehicle after said electric control unit determines that said driver is under said abnormal state, wherein, said electric control unit is configured:

to acquire a driver requiring driving force which is a driving force required by said driver and is decided on the basis of said acceleration pedal operation amount;

to execute a stopped state maintaining control for maintaining said vehicle at a stopped state by performing a driving force limiting control for limiting a supply requiring driving force which said engine is requested to supply to said drive wheels on the basis of said driver requiring driving force to a value equal to or smaller than a driving force which is smaller than said driver requiring driving force, and by performing a continuous braking to continuously apply said braking force to said vehicle from said brake actuator, while said vehicle is stopped through said vehicle stop control;

to forbid a termination of said stopped state maintaining control when said acceleration pedal operation amount is equal to or greater than a threshold value larger than zero, when said termination of said stopped state maintaining control is requested during executing said stopped state maintaining control; and to permit said termination of said stopped state maintaining control when said acceleration pedal operation amount is smaller than said threshold value, when said termination of said stopped state maintaining control is requested during executing said stopped state maintaining control, wherein said electric control unit is configured in such a manner that said termination of said stopped state maintaining control is requested when the stop request button is operated.

* * * * *

UNITED STATES PATENT AND TRADEMARK OFFICE
CERTIFICATE OF CORRECTION

PATENT NO. : 10,384,540 B2
APPLICATION NO. : 15/670675
DATED : August 20, 2019
INVENTOR(S) : Hirotada Otake It is certified that error appears in the above-identified patent and that said Letters Patent is hereby corrected as shown below:

In the Specification

In Column 13, Line 05, after "when", delete "the the" and insert --the--, therefor.

In Column 13, Line 48, delete "unlikelky" and insert --unlikely--, therefor.

Signed and Sealed this
Fifth Day of November, 2019

Andrei Iancu
*Director of the United States Patent and Trademark Office*